United States Patent [19]

Weber

[11] 4,355,011

[45] Oct. 19, 1982

[54] SUPPRESSING DECOMPOSITION OF ALKALINE SOLUTIONS OF SALTS OF ANTHRAQUINONEDISULFONIC ACID

[75] Inventor: Günter Weber, Linden, Fed. Rep. of Germany

[73] Assignee: Linde Aktiengesellschaft, Wiesbaden, Fed. Rep. of Germany

[21] Appl. No.: 256,370

[22] Filed: Apr. 22, 1981

[30] Foreign Application Priority Data

Apr. 26, 1980 [DE] Fed. Rep. of Germany ....... 3016240

[51] Int. Cl.³ .......................................... B01D 53/34
[52] U.S. Cl. .................................... 423/224; 423/226; 423/514; 423/573 G
[58] Field of Search .......... 423/224, 226, 571, 573 R, 423/573 G, 514

[56] References Cited

U.S. PATENT DOCUMENTS

| | | | |
|---|---|---|---|
| 3,904,734 | 9/1975 | Gosden et al. | 423/226 |
| 3,966,876 | 6/1976 | Singleton et al. | 423/571 X |
| 3,972,989 | 8/1976 | Fenton et al. | 423/226 |
| 4,098,886 | 7/1978 | Nicklin et al. | 423/226 |

*Primary Examiner*—Earl C. Thomas
*Attorney, Agent, or Firm*—Millen & White

[57] ABSTRACT

In the scrubbing of gases containing sulfur compounds with an aqueous alkaline solution of salts of anthraquinonedisulfonic acid, alkali sulfates are formed during a salt regeneration step, and these sulfates must be kept under a certain upper limit. This is accomplished by subjecting a partial stream of scrubbing solution to combustion under reducing conditions; however, thiosulfate is also removed, resulting ultimately in the decomposition of the anthraquinonedisulfonates. To overcome this drawback, the liquid product withdrawn from the combustion step is contacted with an oxygen-containing gas to convert alkali sulfides and/or alkali hydrogen sulfides contained therein to alkali thiosulfate, preferably in the presence of a catalytic amount of said salts of anthraquinonedisulfonic acid.

11 Claims, 1 Drawing Figure

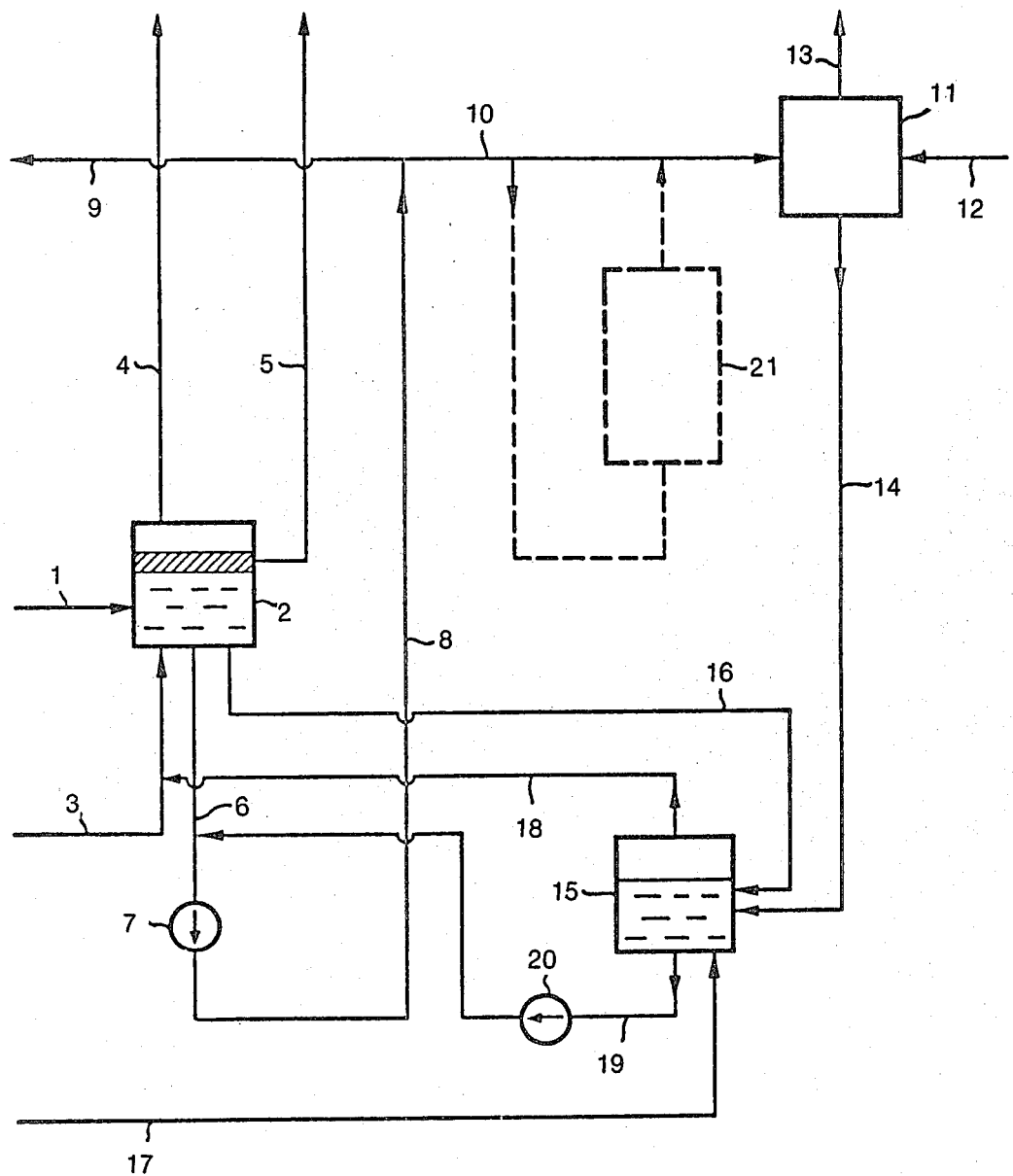

SUPPRESSING DECOMPOSITION OF ALKALINE SOLUTIONS OF SALTS OF ANTHRAQUINONEDISULFONIC ACID

BACKGROUND OF THE INVENTION

This invention relates to the prevention of the decomposition of salts of anthraquinonedisulfonic acid, particularly when the salts are in an aqueous alkaline solution. Such solutions are generally provided in systems for the removal of gaseous sulfur-containing compounds, such as hydrogen sulfide, from various industrial, gaseous mixtures. The invention has special applicability to scrubbing solutions, containing undesired compounds, especially alkali sulfates, formed during the course of the scrubbing step, requiring that a partial stream of the solution be subjected to combustion under reducing conditions so as to remove the sulfates.

In the scrubbing step of gas scrubbing systems as outlined above, the salts of anthraquinonedisulfonic acid contained in the aqueous alkaline solution, the scrubbing liquid, serve, together with vanadium, as oxidizing agents which themselves are reduced during the course of the chemical reactions. To restore their effectiveness, a reoxidation is subsequently conducted with oxygen or an oxygen-containing gas. The sulfur contained in the compounds absorbed by the scrubbing liquid is separated and recovered in elemental form, and the regenerated scrubbing liquid is recycled into the scrubbing stage.

Certain secondary reactions occur during the course of the scrubbing step, especially due to the introduction of oxygen, resulting in the formation of, in part, undesirable compounds. Among these are, above all, alkali sulfates, the concentration of which in the circulating scrubbing liquid must not rise unchecked. In order to remove the thus-formed by-products, a correspondingly dimensioned proportion of the scrubbing liquid is therefore branched off from the main stream and subjected to a special treatment. This treatment resides in a combustion taking place under reducing conditions, during which the by-products are reacted to alkali carbonates, alkali hydrogen carbonates, as well as hydrogen sulfides and/or sulfides. The liquid combustion product stemming from the combustion and containing these compounds can then be recycled into the main stream of the scrubbing liquid, since the interfacing by-products have been converted.

Besides the alkali sulfates, alkali thiosulfates can also be formed during the course of the scrubbing process, which then are likewise extensively decomposed during combustion in correspondence with their proportion in the scrubbing liquid branched off from the main stream. The sulfates and thiosulfates can be formed in greatly varying quantitative ratios, depending on the specific process conditions. Thus, it can also happen that thiosulfate formation occurs either not at all or only to a very minor extent.

However, it has been found that the last-mentioned aspect is of significance in connection with maintaining the anthraquinonedisulfonate concentration in the circulating scrubbing liquid. For the anthraquinonedisulfonates are gradually decomposed, for reasons not fully understood as yet, so that these relatively expensive compounds must be replenished continuously or at regular intervals. However, if thiosulfates are present in the scrubbing liquid in corresponding amounts, then the extent of anthraquinonedisulfonic decomposition recedes markedly and, in certain cases, can even be stopped entirely.

However, it has not always been possible heretofore in all cases to establish and/or maintain an adequate thiosulfate concentration in the circulating scrubbing liquid, especially if, during the course of the scrubbing operation, the amount of thus-formed thiosulfate was nil or only very minor.

SUMMARY OF THE INVENTION

A main object of this invention is to provide a process for suppressing the decomposition of anthraquinonedisulfonates, especially those present in the circulating scrubbing liquid of a gas scrubbing system.

Upon further study of the specification and appended claims, further objects and advantages of this invention will become apparent to those skilled in the art.

To attain these objects, a process is provided so as to maintain the thiosulfate concentration in the scrubbing liquid at a substantially constant and sufficiently high level to suppress decomposition of the anthraquinonedisulfonates. This is accomplished by bringing the liquid combustion product stemming from the combustion into contact with an oxygen-containing gas, during which step alkali sulfides and/or alkali hydrogen sulfides contained therein are converted to alkali thiosulfate.

Accordingly, this invention makes it possible to provide the amounts of thiosulfate necessary for suppressing the anthraquinonedisulfonate decomposition, at any time. This is accomplished in a way very simple from the viewpoint of process technology and without having to introduce additional chemical compounds or inhibitors. The chemical compounds formed during the course of the process are optimally utilized for achieving the purpose which is the objective as posed above. It is merely necessary to provide oxygen, which is required anyway in the total purview of the process, namely during the reoxidation of the oxidizing agents reduced during the course of the scrubbing step. Air can be supplied in order to carry out this feature of this invention, and, if unreacted oxygen remains, the latter can be further utilized subsequently during the aforementioned reoxidation.

In prior art processes, foreign materials are introduced in order to prevent the losses of anthraquinonedisulfonates caused by decomposition. According to British Pat. No. 1,488,659, these materials are aromatic polyhydroxy compounds, for example phenol and hydroquinone, or cresols; according to U.S. Pat. No. 4,060,594, these are inorganic fluorides, borates, or phosphates; and according to U.S. Pat. No. 4,017,594, compounds are used which form thiocyanate.

In an especially advantageous embodiment of the process according to the invention, the liquid combustion product is reacted in the presence of salts of anthraquinonedisulfonic acid, since it has been found that in such a case the thiosulfate formation is substantially accelerated. In this mode of operation, it is likewise unnecessary to add foreign materials, since the aforementioned salts are already contained in the scrubbing liquid. It is therefore possible to mix the liquid combustion products, for example, with a further partial stream of the solution, which is not fed into the combustion, and then subject same to the oxygen treatment. It has been found that it is advantageous in this connection to intermix approximately equally large amounts of liquid combustion product and untreated scrubbing liquid.

The amount of thiosulfate producible in the process of this invention is initially limited by the amount of sulfides and/or hydrogen sulfides contained in the liquid combustion product. However, this limitation can be overcome by adding elemental sulfur, formed inherently in the hydrogen sulfide scrubbing step, so that practically any desired quantity of thiosulfate can be produced.

During the combustion of the partial stream of the solution, decomposition is undergone not only by the undesirable by-products, especially alkali sulfates, but also by the salts of anthraquinonedisulfonic acid, desired in the scrubbing process. To prevent this from happening, it has been suggested to separate these salts prior to combustion, which can be done, for instance, by adsorption. In conjuction with such a procedure, an especially advantageous embodiment of the invention resides in readmixing the separated salts of anthraquinonedisulfonic acid to the liquid combustion product before the reaction with oxygen takes place.

It has proven to be expedient to conduct the reaction provided according to this invention at temperatures of between 20° and 100° C., and at pH values of at least 8. Especially preferred are the ranges between 40° and 90° C., as well as above pH 9. Within the aforementioned temperature and pH ranges, an extensively quantitative conversion of the alkali sulfides is accomplished. Besides, the liquid combustion product is normally already within the aforementioned value ranges with respect to temperature and pH value.

BRIEF DESCRIPTION OF THE DRAWING

The drawing is a schematic flowsheet of a preferred comprehensive embodiment of this invention showing the treatment of a partial stream of scrubbing liquid derived from a gaseous scrubbinhg stage for the removal of hydrogen sulfide.

DETAILED DESCRIPTION OF THE DRAWING

A scrubbing liquid withdrawn from a hydrogen sulfide scrubbing stage is supplied via a conduit 1, this liquid representing an aqueous alkaline solution containing suspended sulfur, alkali vanadate, alkali anthraquinonedisulfonate, as well as products of preceding chemical secondary reactions. This solution enters an oxidizing vessel 2 where it is brought into contact with an oxygen-containing gas, for example, air introduced via a conduit 3. The elemental sulfur formed from the scrubbed-out hydrogen sulfide accumulates on the surface of the liquid phase and is discharged via a conduit 5. Oxygen-depleted air is withdrawn via conduit 4.

The regenerated scrubbing liquid is removed from the oxidizing vessel via a conduit 6 by means of a pump 7 and recycled via conduits 8 and 9 into the scrubbing stage. This scrubbing liquid is an alkaline aqueous solution containing, for example, 14.5% by weight of sodium sulfate, 1.9% by weight of sodium thiosulfate, 2.2% by weight of sodium bicarbonate, 0.3% by weight of sodium carbonate, 0.1% by weight of sodium vanadate, and 0.2% by weight of sodium anthraquinonedisulfonate. Sodium sulfate and sodium thiosulfate are products of unavoidable secondary reactions.

In order to limit the sodium sulfate content in the scrubbing liquid, a relatively small proportion of the scrubbing liquid is continuously branched off via a conduit 10 and introduced into a combustion chamber 11. In the latter, combustion takes place under reducing conditions, while feeding a fuel gas through conduit 12. A gas, which contains hydrogen sulfide, is withdrawn via a conduit 13 and optionally returned into the raw gas to be introduced into the scrubbing stage. A liquid combustion product is removed via a conduit 14 and introduced into a reactor 15. The liquid aqueous combustion product contains at this point merely 1.7% by weight of sodium sulfate and 0.1% by weight of sodium thiosulfate, but 4.0% by weight of sodium hydrogen sulfide as well as furthermore 3.7% by weight of sodium bicarbonate and 6.9% by weight of sodium carbonate. The vanadium content is alsmost unchanged, whereas the sodium anthraquinonedisulfonate is decomposed in the combustion chamber. The temperature of the liquid combustion product ranges at about 90° C.; the pH ranges at about 10.

The liquid combustion product is mixed in reactor 15 with a partial stream of regenerated scrubbing liquid discharged via conduit 16 from the oxidizing vessel 2. The amounts of the liquids fed into the tank 15 via conduits 14 and 16 are of approximately the same size. The mixture formed in tank 15 is brought into contact with air fed via a conduit 17, and the sodium hydrogen sulfide is during this step almost quantitatively reacted to sodium thiosulfate by the reaction with atmospheric oxygen. The proportion of sodium thiosulfate in the solution thus rises to 3.8% by weight, whereas, the proportion of sodium hydrogen sulfide drops almost to zero, and the remaining components are essentially unchanged with respect to their concentration. Air depleted in oxygen and containing a small amount of hydrogen sulfide is removed via a conduit 18 into the oxidizing vessel 2. The solution enriched with sodium thiosulfate is withdrawn via a conduit 19 by means of a pump 20 and recycled into the stream of scrubbing liquid.

In order to avoid the decomposition of sodium anthraquinonedisulfonate in the combustion chamber 11, the compound can be separated in an adsorption installation 21 connected in front of this combustion chamber. After regeneration of the adsorption packing with water, a liquid results containing essentially only the thus-separated sodium anthraquinonedisulfonate. If this solution is mixed with the liquid combustion product and reacted, in place of the regenerated scrubbing liquid fed via conduit 16, this can under certain circumstances have advantageous effects on the dimensioning of the tank 15. With an increased concentration of sodium anthraquinonedisulfonate in this solution, this tank can thus be of a correspondingly smaller size.

In other words, it has been discovered that salts of anthraquinonedisulfonic acid serve as a catalyst for the production of sodium thiosulfate.

The invention is particularly useful in connection with the Stretford process which is a well-known process for converting hydrogen sulfide to elemental sulfur and is described in U.S. Pat. Nos. 2,997,439, 3,035,889 and in British Pat. No. 948,270.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the suppression of the decomposition of an aqueous alkaline solution of salts of anthraquinonedisulfonic acid, said solution containing alkali sulfates, wherein a main stream of said solution is provided, and a partial stream of the solution is removed from said main stream and is subjected to combustion taking place under reducing conditions to remove said sulfates, and withdrawing a liquid product from the combustion, the improvement which comprises contacting the liquid product withdrawn from the combustion with an oxygen-containing gas to convert alkali sulfides and/or alkali hydrogen sulfides contained therein to alkali thiosulfate, and admixing a sufficient concentration of the alkali thiosulfate formed with said main stream of aqueous alkaline solution of salts so as to suppress decomposition of said salts of anthraquinonedisulfonic acid.

2. A process according to claim 1, wherein said aqueous solution of salts is obtained from a scrubbing step for the removal of gaseous sulfur compounds from a gaseous mixture.

3. A process according to claim 1, wherein said liquid combustion product is reacted in the presence of a quantity of salts of anthraquinonedisulfonic acid sufficient to catalyze the formation of alkali thiosulfate.

4. A process according to claim 3, wherein the liquid combustion product is reacted together with a further partial stream of said aqueous alkaline solution in contact with the oxygen-containing gas.

5. A process according to claim 3, further comprising conducting a selective separation of the salts of anthraquinonedisulfonic acid before the combustion of the partial stream of the solution; and reacting the liquid combustion product together with the thus-separated salts of anthraquinonedisulfonic acid.

6. A process according to claim 1, further comprising adding elemental sulfur to the liquid combustion product so as to form additional alkali thiosulfate.

7. A process according to claim 3, further comprising adding elemental sulfur to the liquid combustion product so as to form additional alkali thiosulfate.

8. A process according to claim 1, further comprising conducting the reaction forming alkali thiosulfate at temperatures of between 20° and 100° C., and at pH values of at least 8.

9. A process according to claim 1, further comprising conducting the reaction forming alkali thiosulfate at temperatures of between 40° and 90° C., and at pH values of at least 9.

10. A process according to claim 3, further comprising conducting the reaction forming alkali thiosulfate at temperatures of between 20° and 100° C., and at pH values of at least 8.

11. A process according to claim 1 further comprising admixing a sufficient concentration of said alkali thiosulfate thus formed with said mainstream of aqueous alkaline solution of salts before the point at which said partial stream is removed from said mainstream.

* * * * *